United States Patent [19]

Pontefract

[11] 4,014,214
[45] Mar. 29, 1977

[54] LIQUID LEVEL INDICATOR

[75] Inventor: Robert A. Pontefract, Chelmsford, Mass.

[73] Assignee: Jerguson Gaga and Valve Company, Burlington, Mass.

[22] Filed: Jan. 19, 1976

[21] Appl. No.: 650,280

[52] U.S. Cl. .............................................. 73/330
[51] Int. Cl.² .................................. G01F 23/02
[58] Field of Search ............ 73/330, 329, 328, 331; 116/118 R

[56] References Cited
UNITED STATES PATENTS

| | | | |
|---|---|---|---|
| 470,858 | 3/1892 | Klinger | 73/330 X |
| 500,444 | 6/1893 | Vetter et al. | 73/330 |
| 852,781 | 5/1907 | Fisher | 73/330 |
| 1,240,251 | 9/1917 | Pocock | 73/330 |
| 1,380,080 | 5/1921 | Sargent | 73/330 |
| 1,488,403 | 3/1924 | Macbeth | 73/330 X |
| 2,071,411 | 2/1937 | Lamesch | 73/330 X |

Primary Examiner—Richard C. Queisser
Assistant Examiner—Joseph W. Roskos
Attorney, Agent, or Firm—McNenny, Pearne, Gordon, Gail, Dickinson & Schiller

[57] ABSTRACT

A liquid level gauge having a body defining a liquid receiving chamber, a transparent reflex glass at an open face of the body chamber for maintaining liquid within the chamber while providing visual access into the chamber, a removable cover plate maintaining the reflex glass in sealing engagement with the chamber body, the reflex glass including on its inner face a plurality of longitudinally extending prisms adapted to be contacted by liquid in the chamber, a background plate within the walls of the chamber, and means to space the background plate from the reflex body to permit circulation of liquid therebetween, the background plate displaying through the reflex glass a high visual contrast, e.g., a bright color, between wetted and nonwetted areas of the reflex glass. As disclosed, the reflex glass may be formed of a transparent plastic material and be arranged with a relatively thin cross section to permit its use as an insert for assembly with an outwardly disposed primary pressure-retaining glass.

8 Claims, 4 Drawing Figures

U.S. Patent  Mar. 29, 1977  4,014,214
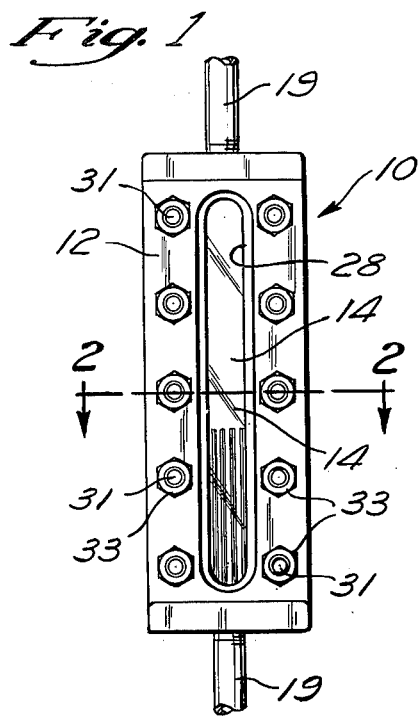
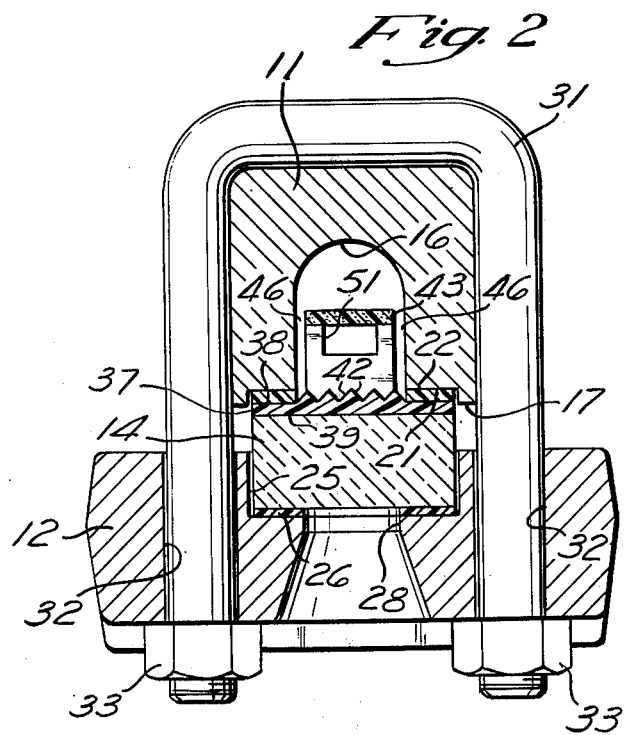
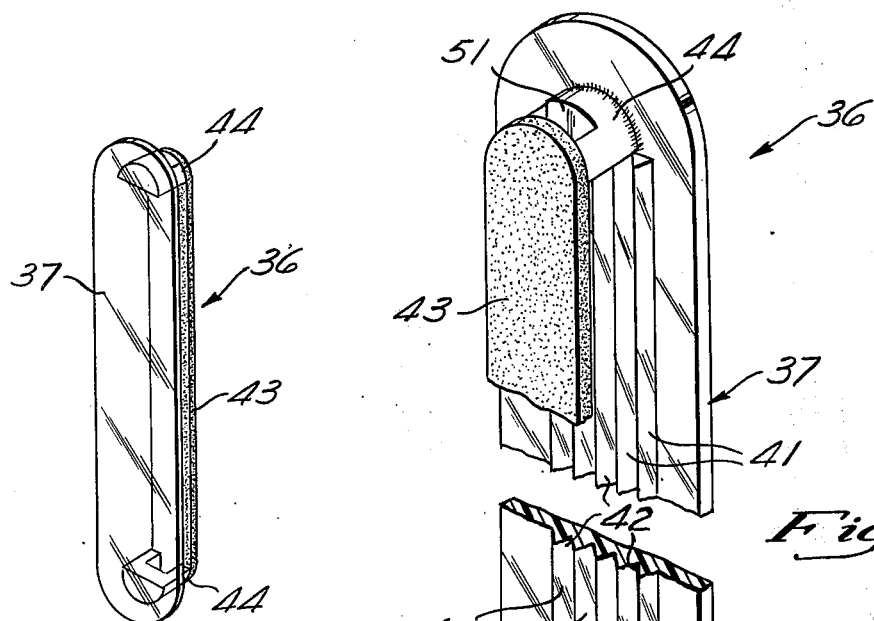
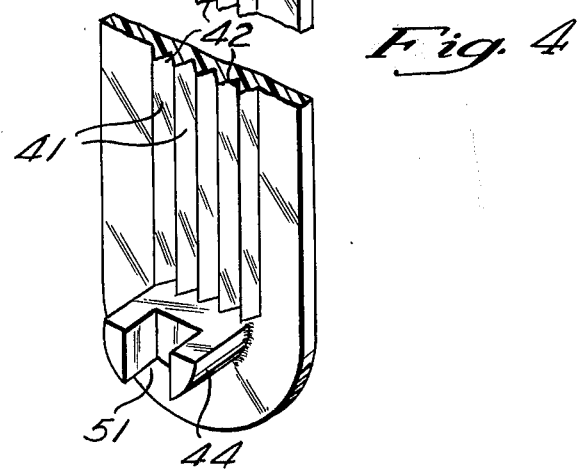

LIQUID LEVEL INDICATOR

BACKGROUND OF THE INVENTION

The invention relates to liquid level gauges, and particularly to improvements in such gauges of the reflex type.

PRIOR ART

Boilers, heaters, process tanks, and other vessels are typically provided with a gauge by which the liquid level is read directly by viewing through a glass or other transparent solid medium. It is known, for example, from U.S. Pat. No. 470,858 to provide the liquid contacting face of the gauge glass with reflex prisms to increase the visual contrast between wetted and nonwetted areas, thereby accentuating the position of the liquid level. It is also known from U.S. Pat. No. 906,736 to provide such prisms as extensions from the main body of the gauge glass rather than as recesses into the glass body. Further, it has been suggested in the aforementioned U.S. Pat. No. 470,858 that interior walls of the chamber revealed by the gauge glass be colored to improve contrast in the reflex phenomenon. U.S. Pat. No. 2,071,411 discloses a plurality of separate, transparent glass layers in a gauge to achieve desired service characteristics and to permit replacement of an individual layer when damaged by erosion or loss of clarity.

SUMMARY OF THE INVENTION

The invention provides a transparent prismatic sight gauge element which, according to one aspect of the invention, is adapted to be employed as an insert for protection of a primary pressure-retained glass from direct contact with the fluid being monitored. Ideally, the insert element has a relatively thin cross section comprising a planar base of limited thickness and a plurality of integral, longitudinal prisms extending from their roots on the base inwardly of the gauge chamber. The insert is economical to manufacture, since it requires minimal volume of material for its fabrication, and is compatible with existing hardware, since it often can be simply added to existing assemblies, taking up previously unused space. Such retrofit applications in existing hardward thereby avoid the necessity of discarding otherwise serviceable goods and avoid the necessity of derating such units to a lower working pressure. Where a reduction in the net thickness of the primary pressure retaining glass element is necessary to accommodate the thickness of the insert, such a reduction is minimal.

The thin base section of the insert, moreover, has a greater tendency to resist creep than would result from the use of heavier sections. Further, the disclosed projecting prisms, besides affording the above-mentioned benefits, avoid internal tensile stresses in the insert to thereby reduce the risk of structural failure of the insert in service.

Another important aspect of the invention is the provision of a background plate supported within the fluid viewing chamber by the reflex element. As disclosed hereinbelow, the background plate is substantially coextensive with the area of the reflex prisms and is arranged to provide a high visual contrast with the characteristic silver appearance displayed by nonwetted prism areas. The background plate is held by support means on the reflex element in spaced parallel relation to the reflex prisms, and is longitudinally and transversely dimensioned to fit within the fluid displaying chamber. The background plate is particularly beneficial when used in a fluid chamber formed of a material having a silver appearance such as austenitic stainless steels, nickel steels, or the like, since very low contrast with the internally reflecting, nonwetted portion of the prism is otherwise displayed.

BRIEF DESCRIPTION OF THE DRAWINGS

FIG. 1 is an elevational view of a liquid level reflex gauge assembly constructed in accordance with the invention;

FIG. 2 is a cross sectional view of the gauge assembly taken along the line 2—2 indicated in FIG. 1;

FIG. 3 is a front perspective view of a reflex element and background plate of the invention; and FIG. 4 is a rear perspective view of the reflex element and background plate.

DESCRIPTION OF THE PREFERRED EMBODIMENT

Referring now to the drawing, and in particular to FIGS. 1 and 2, a liquid level gauge assembly 10 includes a housing comprising a chamber body 11 and a cover plate 12. The body 11 and cover plate 12 are ordinarily constructed of steel or alloy steel. A gauge glass 14 is captured between the body 11 and cover 12.

The body 11 includes an elongated, liquid displaying chamber 16 in the form of a blind slot extending inwardly of the body from a forward face 17 thereof. At each end of the body 11 a nipple 19 or other means provides communication with respective ends of the slot 16 and a liquid containing vessel to be monitored. Typically, the nipples 19 are connected to the vessel at points above and below the normal range of the level of liquid in the vessel. The forward body face 17 is recessed at 21 in the area immediately adjacent the slot 16 to provide a seat for a sealing gasket 22.

A relatively deep recess or cavity 25 is machined or otherwise formed in the cover plate 12 for reception of the gauge glass 14. A gasket or pad 26 is disposed between the base of the cavity 25 and the glass 14 to avoid direct contact of the glass with the surface of the cover 12. A viewing aperture 28 is provided as a single, longitudinal slot or as a series of tandem slots running substantially the full length of the cover to afford visual access into the chamber 16. The viewing aperture 28 is generally as wide and as long as the liquid receiving chamber 16. A plurality of U-bolts 31 are assembled in pairs of holes 32 on opposite sides of the viewing slot 28. The U-bolts 31 are dimensioned to embrace the chamber body 11 and extend through the cover 12 to permit nuts 33 to be tightened against the cover.

The gauge glass 14 may be relatively thick in cross section to withstand relatively high pressure within the chamber 16. Where desired, the glass 14 may be provided in more than one layer or lamination to obtain characteristics not obtainable with a single layer. The term "glass" as used herein will be understood to be generic to inorganic, transparent materials such as the commonly used silicate-based glasses and organic transparent materials such as polycarbonate or acrylic resins, which are transparent to the visible part of the light spectrum.

Disposed on the inner side of the glass 14 is a prismatic insert or gauge glass 36 having an elongated base region 37 of relatively limited thickness defined by inner and outer planes 38 and 39. The area of the insert base 37 is substantially coextensive with the pressure-retaining gauge glass 14, and, like a conventional gauge glass as shown in FIGS. 3 and 4, is rounded at its ends.

A plurality of longitudinally extending reflex prisms 41 are integrally formed on the insert 37. The prisms 41 are situated at the central area of the width of the insert base 37 and extend lengthwise of the insert such that they cover an area substantially coextensive with the open area of the slot 16 at the plane of the associated gasket 22, as well as the extend of the viewing aperture 28 in the cover 12. The inner surface of the insert base 37 defined by the plane 38 encircles the prism area laterally and endwise to provide a continuous perimeter seal with the gasket 22. The reflex prisms 41 are preferably formed integrally with the insert base 37, with their roots at the inner face or plane 38 of the base such that they project inwardly toward the chamber 16. In the illustrated embodiment, faces 42 of the prisms 41 are at right angles to one another, and the height of the prisms is generally at least as large as the thickness of the base 37.

A background plate 43 is held in spaced, parallel alignment with the prismatic insert 36 by support means 44 at each end of the insert 36. As shown in FIG. 2, the background plate has a transverse width taking up a major portion of the width of the chamber 16, with the exception of clearance zones 46 of limited dimension on either of its sides, the drawing at FIG. 2 being substantially proportionately to scale. The plate 43, being slightly shorter than the insert base 37, covers substantially all of the direct viewing area offered by the aperture 28 along a line perpendicular to the plane of the glass 14.

The support means 44 at each end of the background plate is bifurcated or otherwise sectioned in the transverse plane of the view of FIG. 2 so that support means takes up only a limited region of the chamber 16 in front of the plate 43 and a remaining area, designated 51, is unobstructed to permit free longitudinal circulation of liquid past the front surface of the background plate 43 and over the prisms 41.

The insert 36, comprising the base 37 and prisms 41, is preferably formed of a plastic material, such as acrylic or polycarbonate resin, transparent to the visible part of the light spectrum. However, in certain cases it is contemplated that the insert 36 may be fabricated of inorganic, transparent material, such as silicate-based glass. In the presently preferred embodiment, the support means 44 is integrally molded with the insert 36. However, the support means may be integrally molded or otherwise formed with either the insert 36 or background plate 43, or both. Where it is separately formed from either or both of these elements 37, the support means 44 may be bonded or fixed to such element or elements as by a suitable glue or welding process, for example.

The background plate 43 ideally is brightly colored to provide a sharp visual contrast with the characteristic silver or glassy appearance of a nonwetted, internally reflecting portion of the insert. This high contrast is depicted in FIG. 1 by the dark zone at the lower area of the glass 14 compared to the light zone at the remaining upper area of the glass. Where the insert 36 is a clear, i.e., colorless, transparent material, suitable background plate colors include red, green, safety orange, black and dark grey, to contrast with a characteristic silver-white reflex appearance. Where the background plate 43 is integrally formed with the insert 36, as by molding, it may be subsequently colored by coating it with a suitable material or otherwise treated to exhibit a visual contrast with the characteristic appearance of the internally reflecting portion of the insert. The finished background plate 43 may be opaque, transparent, or translucent.

The reflex insert 36 is arranged with a relatively thin cross section where, as shown, the total thickness of the insert defined by the thickness of the base portion 37 and height of the prisms 41 is substantially less than the width of the insert. This relatively thin cross section permits the insert 36 to be employed in existing gauge hardward inwardly of the conventional pressure-retaining gauge glass. The projecting prisms avoid internal tensile stresses in the base 37 otherwise developed with the use of recessed prisms when subjected to pressure of fluid in the chamber 16. Further, the thin section of the base itself minimizes creep under high pressure for extended periods.

While the invention has been described in connection with specific embodiments thereof, it is to be clearly understood that this is done only by way of example, and not as a limitation to the scope of the invention as set forth in the objects thereof and in the appended claims.

What is claimed is:

1. A reflex glass assembly for a liquid level gauge comprising an elongated, transparent body, an inner face of said body having a plurality of parallel, longitudinally extending reflex prisms, a background element spaced inwardly of said inner body face, said background element displaying a high visual contrast to the characteristic reflex appearance of the reflex body at a nonwetted area thereof, and means extending between said background element and said body and supporting said background element on said reflex body, said background element support means being adapted to be disposed within a liquid-containing chamber and being adapted to support said background element independently of said chamber.

2. A reflex glass assembly as set forth in claim 1, wherein said background element is an elongated member and said support means maintains said background element in spaced parallel relation to said reflex body.

3. A reflex glass assembly as set forth in claim 1, wherein said reflex prisms extend transversely and longitudinally across a central area of said body, said background element having a transverse width slightly less than the transverse extend of said central prism area to provide limited side clearance of said background element in a liquid-containing chamber sealed and visually revealed by said reflex body.

4. A reflex glass assembly as set forth in claim 1, wherein said transparent body is clear and wherein said background element is arranged to provide said high visual contrast by displaying a bright color contrast with a characteristic silver-white reflex appearance of said body.

5. A reflex glass assembly as set forth in claim 1, wherein said support means is integral with one or both of said reflex body and background element members.

6. A reflex glass assembly as set forth in claim 5, wherein said support means includes a support member adjacent each end of said background element.

7. A reflex glass assembly as set forth in claim 6, wherein each end adjacent support member has a cross sectional area in a plane transverse to the longitudinal direction of said reflex body less than the area between said background element and said reflex body described by the lateral extent of the background element, whereby the liquid flow between said background element and reflex body is substantially unimpeded.

8. An insert for a liquid level gauge comprising a reflex body, a background element and means supporting the background element on the reflex body, said reflex body being formed of a rigid, clear, transparent plastic material and including an elongated planar base portion, said base portion having rounded ends and a substantially planar outer surface adapted to abuttingly engage a planar face of a primary pressure-retaining gauge glass, a plurality of longitudinally extending prisms integrally formed with their roots on the rear face of said base portion and projecting rearwardly therefrom, said base portion including a rearwardly facing planar sealing surface completely surrounding said prisms both laterally and endwise and adapted to seal a chamber in which liquid is observed through said insert, the height of said prisms being at least in the order of the thickness of the base portion between said inner and outer planes, the total thickness of said reflex body, formed by the combined thickness of said base portion and the height of said prisms, being substantially less than the width of said base portion, said background element being a generally planar structure having a length substantially as long as said prisms and a width somewhat less than the transverse field of the prisms whereby said background element affords limited lateral clearance in the chamber of liquid being observed, said support means including means projecting between said reflex body and said background element at each end thereof, said projecting means being integrally formed with at least one of said reflex body or background element members and being fixed to the other, said projecting means supporting said background element is spaced, parallel relation to said reflex body.

* * * * *